May 8, 1951 R. J. HUDAK 2,552,280
EPISCOPIC ILLUMINATOR FOR OPTICAL PROJECTION COMPARATORS
Filed Dec. 9, 1948 5 Sheets-Sheet 1

ROBERT J. HUDAK
INVENTOR

May 8, 1951 R. J. HUDAK 2,552,280
EPISCOPIC ILLUMINATOR FOR OPTICAL PROJECTION COMPARATORS
Filed Dec. 9, 1948 5 Sheets-Sheet 2
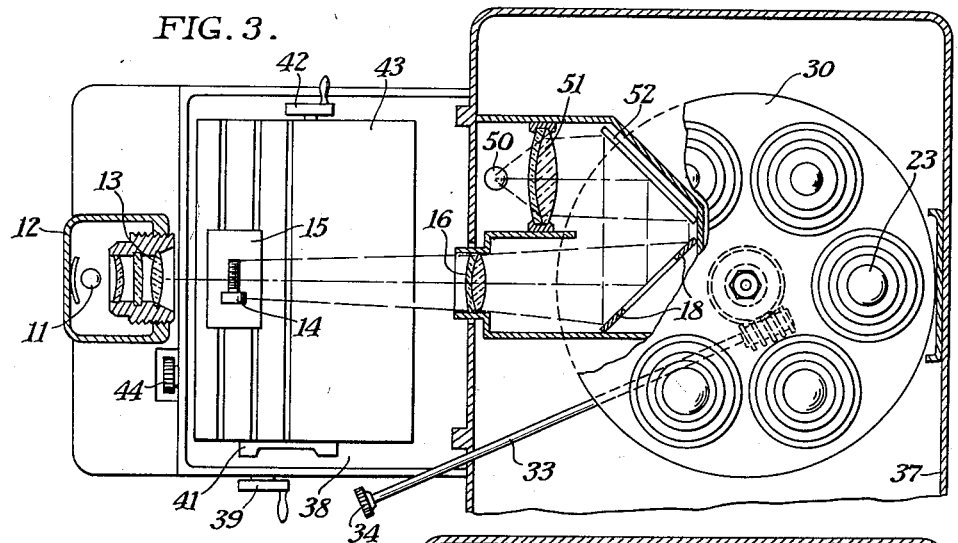
ROBERT J. HUDAK
INVENTOR

ROBERT J. HUDAK
INVENTOR
ATTORNEYS

May 8, 1951 R. J. HUDAK 2,552,280
EPISCOPIC ILLUMINATOR FOR OPTICAL PROJECTION COMPARATORS
Filed Dec. 9, 1948 5 Sheets-Sheet 4

ROBERT J. HUDAK
INVENTOR
Newton M Perkins
BY F M Emerson Holmes
ATTORNEYS

May 8, 1951 R. J. HUDAK 2,552,280
EPISCOPIC ILLUMINATOR FOR OPTICAL PROJECTION COMPARATORS
Filed Dec. 9, 1948 5 Sheets-Sheet 5

ROBERT J. HUDAK
INVENTOR
BY
ATTORNEYS

Patented May 8, 1951

2,552,280

UNITED STATES PATENT OFFICE 2,552,280

EPISCOPIC ILLUMINATOR FOR OPTICAL PROJECTION COMPARATORS

Robert J. Hudak, Rochester, N. Y., assignor to Eastman Kodak Company, Rochester, N. Y., a corporation of New Jersey Application December 9, 1948, Serial No. 64,406

7 Claims. (Cl. 88—24)

This invention relates to profile projectors and optical comparators. The preferred embodiments thereof constitute improvements of the optical system described in patent application Serial No. 64,404 filed concurrently herewith by Turner and Kingslake.

One feature of the invention, having to do with episcopic illumination is applicable to all forms of optical comparators although it is most particularly useful with the preferred form of the Turner and Kingslake system.

The main object of the invention is to provide an optical comparator which permits episcopic illumination of the work piece. All prior instruments in which episcopic illumination was attempted failed to give uniform illumination, failed to give bright illumination, and usually involved elements which physically interfered with the working clearance between the work piece and the projection lens of the comparator. The object of the present invention is primarily to overcome the first two of these objections and incidentally it also overcomes the third objection in a very desirable manner.

It is also an object of the invention to provide a comparator of the Turner and Kingslake type in which the screen is conveniently located above the work piece and vertical, with an image thereon, properly oriented to correspond to the orientation of the work piece itself.

The combination of the episcopic illuminator according to the present invention, with the long working distance obtainable by the Turner and Kingslake invention mentioned above, permits the location of a standard surface adjacent to the work piece for direct comparison therewith. Alternatively the standard may be located to one side and a suitable reflector over part of the field will act to reflect light from the standard into the optical system along with light from the work piece. The long working clearance permits the use of such a reflector.

According to the present invention the various parts of the Turner and Kingslake optical system are located so that the screen is vertical and above the work piece and this arrangement is obtained by three reflectors between the first objective system which is horizontal and the screen. Preferably at least one of the reflectors sends the light vertically upward to form the first aerial image in a horizontal plane, where it is picked up by the second objective which has its axis vertical, and at least one of the reflectors then reflects the light horizontally again to the vertical screen. That is, either one, or two reflectors forming an optic square or pentareflector, is located between the first and second objective systems. When only one reflector is so used, two reflectors arranged as a pentareflector are located between the second objective and the screen, but when a pentareflector is used between the two objective systems, only a single reflector is used after the second objective.

The episcopic feature which is particularly useful when combined with an optical system having one relay stage, consists of a light source and means for reflecting the light from the source backwards through at least the first lens of the optical system onto the work piece. This gives front illumination which is almost normal, without introducing any mirrors or other objectionable parts between the work piece and the first lens of the optical system. It gives much brighter episcopic illumination and much more efficient illumination. Furthermore, the illumination appears much more uniform since it is not oblique with respect to the light returning from the work piece to the lens system. In actual practice, this episcopic illumination has been found to bring out excellently even the minutest details of the interior of a watch, for example.

Such an episcopic system of illumination is useful in any optical comparator, the light being sent backward through an optical system or at least through the first lens of the optical system to the work piece. It is particularly suitable to a relay system and to the preferred form of relay system in which the first objective is an afocal system. The lack of the need for critical adjustment of an afocal system is one reason the present episcopic system is valuable therewith, and secondly, it is convenient to locate reflectors adjacent to the episcopic stop in the mutual focal plane in the two lenses forming the afocal system so that these reflectors at 45°, or for that matter at any other convenient angle, can receive light from a lamp located at one side of the system and reflect it back through the first lens of the afocal system onto the work piece. It is not only convenient to have the reflectors at this point, but it is highly desirable to do so because this arrangement keeps the effect of "back-reflections" from lenses in the system to a minimum.

The details of the preferred forms of my invention are set forth in the accompanying drawings in which:

Fig. 2 is a side elevation partly in section of the comparator shown in Fig. 1.

Fig. 3 is similarly a plan view partly in section of the comparator shown in Fig. 1.

Figs. 6 to 9 similarly show various arrangements of the episcopic illumination according to the present invention.

Figure 10:
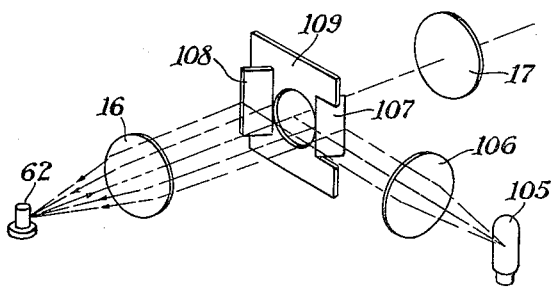
Figure 11:
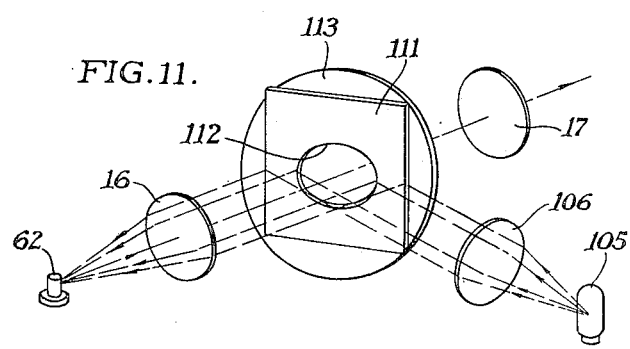

Figs. 10 and 11 show in perspective two alternative arrangements of reflectors for providing episcopic illumination through an afocal system.

Figure 12:
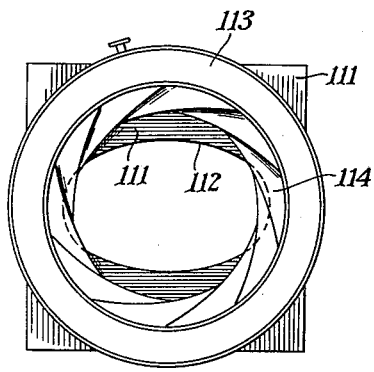

Fig. 12 is a rear view of the diaphragm and reflector element of Fig. 11.

Figure 13:
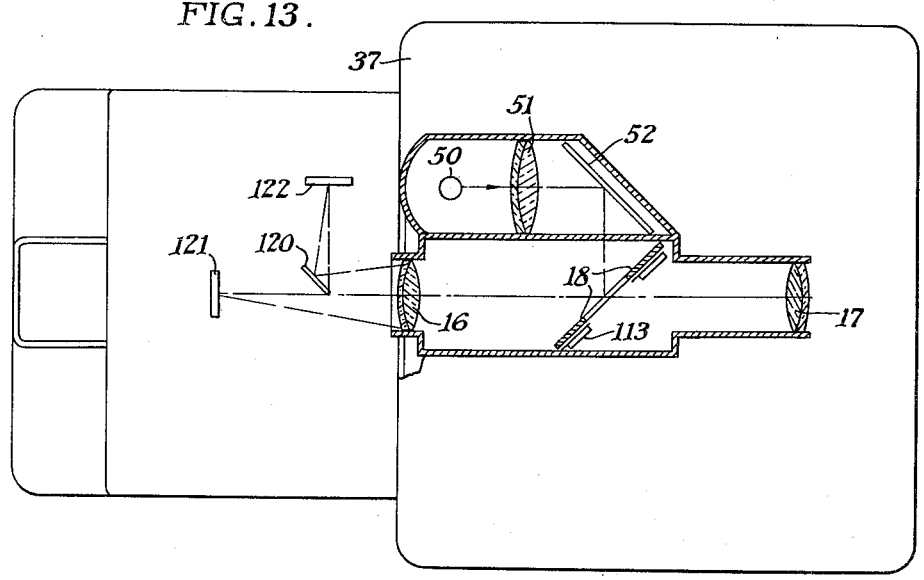

Fig. 13 is a plan view showing episcopic comparison of a work piece and a standard.

Figure 1:
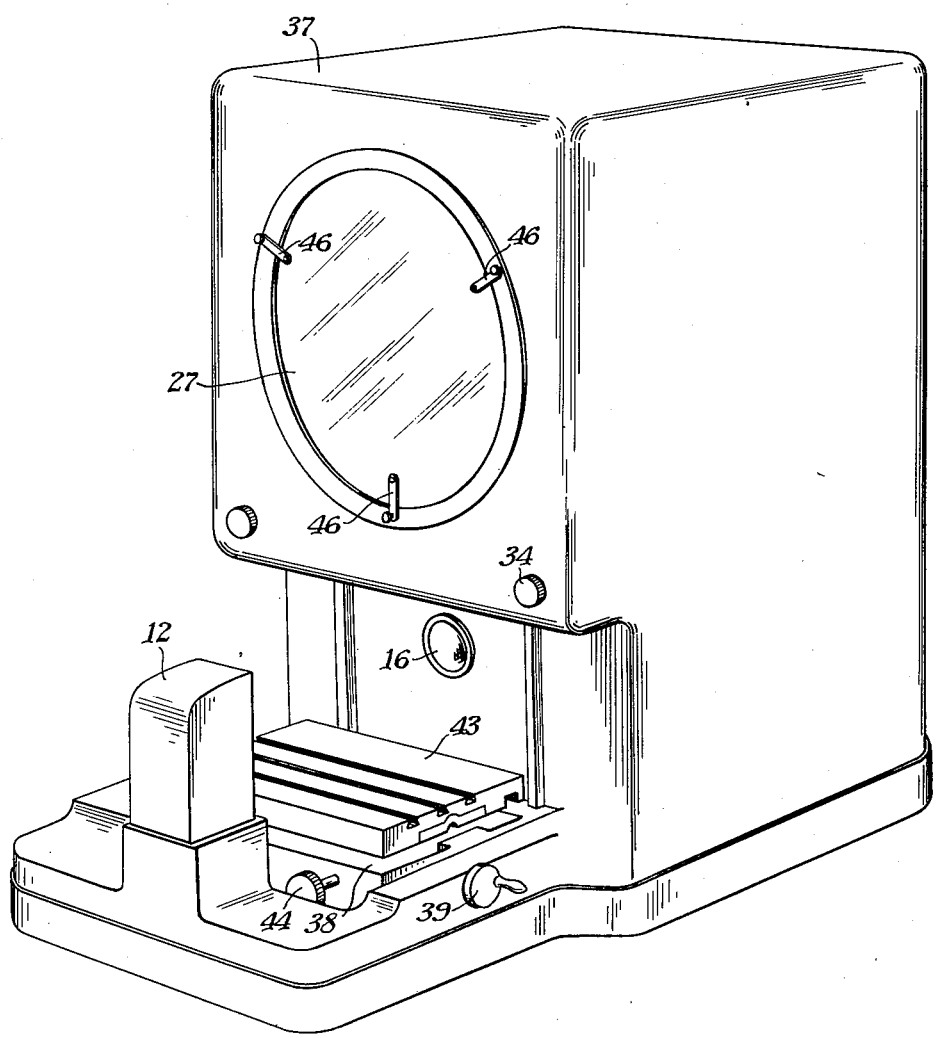
Fig. 1 is a perspective view of an optical comparator incorporating the present invention.

The object under test does not appear in Fig. 1, but Figs. 1, 2 and 3 will all be described together. Light from a lamp 11 in a lamphouse 12 is rendered substantially parallel by a condenser lens 13 and serves to illuminate the profile of a work piece 14 carried on a fixture 15. Light from the work piece is focused by an afocal system consisting of lenses 16 and 17 to form an aerial image 21, after reflection by a pentareflector 20. The lenses 16 and 17 have equal focal lengths and are separated by the sum of their focal lengths with the effective stop 18 located in the mutual focal plane of the two lenses 16 and 17. This arrangement renders the system telecentric in both directions so that all portions of the object 14 whether in focus or not are equally magnified and in the embodiment shown, the image at the point 21 can be compared with a standard reticle even if the standard is not accurately located in the plane of the image 21. Since the lenses 16 and 17 are of equal power, the image 21 has unit magnification. The afocal system may be moved along the optic axis either toward or away from the object 14, without affecting either the location or magnification of the image 21. This is a property of afocal systems. However, in order to maintain the maximum relative aperture and complete correction of distortion, coma and lateral color it is preferable to have the afocal system symmetrically located between the object 14 and the image 21. That is, the optical distance from 14 to 16 should equal the optical distance from 17 to 21.

A field lens 22 located substantially at the image plane 21 focuses the stop 18, or more exactly, the image thereof into the internal stop 24 of an ordinary objective 23. In some systems, maximum correction of aberrations requires the field lens 22 to be right at or so close to the image plane 21 that the comparison reticle feature must be omitted but it is of minor importance anyway. The objective 23 relays the image from the point 21 via a reflecting surface 26 and forms a greatly enlarged image thereof on a rear projection screen 27. Since one of the purposes of the present invention is to obtain high magnification in a small instrument, the objective 23 covers a relatively wide angle which normally would tend to introduce uneven brightness of the image on the screen 27 as viewed from the front. To overcome this, a Fresnel lens 28 is positioned immediately behind the screen 27 to act as a field lens for the image formed on this screen. It will be noted that the working distance between the object 14 and the lens 16 depends only on the focal length of the lens 16, whereas the magnification of the system depends only on the focal length of the lens 23. Thus large working distance and high magnification in short over-all length are obtained by selecting a large focal length for lens 16 and a small focal length for the lens 23. Various magnifications are obtained by substituting various focal length lenses for the second objective lens system 23.

In the arrangements shown in Figs. 2 and 3, a turret 30 of lenses is provided carrying six interchangeable lenses one of which is the lens 23 and another of which is labeled 32. It should be noted that each of the interchangeable lens systems includes its own field lens and in each case the field lens is located at its own focal length in front of the internal stop of the objective lens used. In order to provide some clearance between the field lens and the image 21, the higher magnification objectives such as 32 include a negative lens 35. The turret 30 is mounted to rotate on a suitable bearing 31 and rotation is provided through a shaft 33 having a worm drive engagement with the turret 30, by a knob 34 conveniently located on the front of the instrument.

In order to provide motion of the object 14 in any of the three directions, the fixture 15 is carried on a work holder consisting of a table 38 which is raised and lowered by a simple jack mechanism by rotation of the knob 39. This table 38 carries with it an intermediate table 41 which can be moved longitudinally of the optic axis by a simple nut and screw arrangement operated by knob 42 which moves up and down with the table 38. The top table 43 rides on the intermediate table 41 and is moved transversely by a simple nut and screw arrangement operated by knob 44.

The optical system is carried by a relatively rigid framework 36 and the whole instrument is provided with a housing 37. Comparison charts may be mounted on the screen 27 and held there by clips 46. A horizontal shelf 47 is provided in the plane of the image 21 to support a comparison reticle or chart for direct comparison with the image (both the image and the reticle appear enlarged on the screen 27).

Alternative to the profile illumination from the lamp 11, it is often desirable to make episcopic examinations of an object such as the object 14. One very convenient manner of doing this according to the present invention is illustrated in Fig. 3. Light from a lamp 50 is rendered parallel by a large condenser 51 and is reflected by a mirror 52 to a ring-shaped reflector 18 the aperture in which serves as the telecentric stop of the afocal system just described. This light is then reflected by the reflector 18 through the lens 16 to illuminate the object 14 from the front and for all practical purposes this illumination is normal with respect to the light going from the object 14 back through the optical system to the screen 27. This arrangement is found to be many time superior to any episcopic system in which the light strikes the object at high obliquity and hence low efficiency as far as producing image-forming light is concerned. For example, if the light strikes the object 14 at an angle of 45° to the optical system, the specularly reflected light from the front surface of the object is completely lost and passes off to one side of the optical system. With the present illumination, on the other hand, the specularly reflected beam is utilized for all parts of the object which are approximately normal to the optic axis. The actual improvement obtained is highly significant and should be seen to be appreciated fully.

Figure 4:
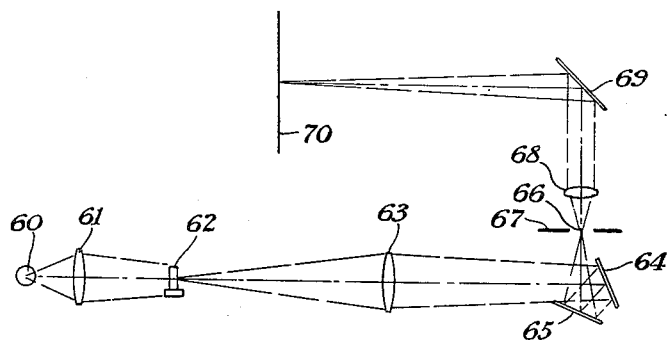
Figs. 4 and 5 are conventional diagrams of optical systems showing alternative arrangements of the three reflectors.
Figure 5:
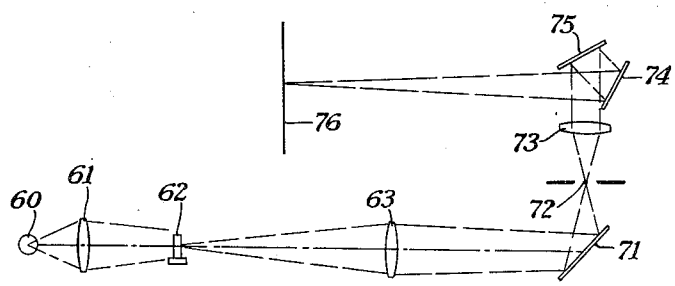

In Fig. 4 light from a lamp 60 through a condenser 61 illuminates the profile of a test object 62. This profile is imaged by a single objective 63 to form an aerial image 66, which is relayed by a lens 68 to form a highly magnified image on a screen 70. So that the screen 70 may be vertical and convenient above the test object 62, three reflectors are provided. Two of these form pentareflectors 64 and 65 optically between the objective 63 and the second objective 68. The third one 69 is optically between the objective 68 and the screen 70. In the embodiment shown, a reticle support 67 is provided in the plane of the image 66 and with the arrangement of three mirrors as shown this support 67 is horizontal so that reticles or other indicia bearing numbers to be compared with the image may simply be laid thereon without any fastening means. Alternatively, as shown in Fig. 5, a single refractor 71 may be used ahead of the aerial image 72 which is then relayed by an objective 73 to a screen 76. In this case two reflectors 74 and 75 form a pentareflector optically between objective 73 and a screen 76.

Figure 6:
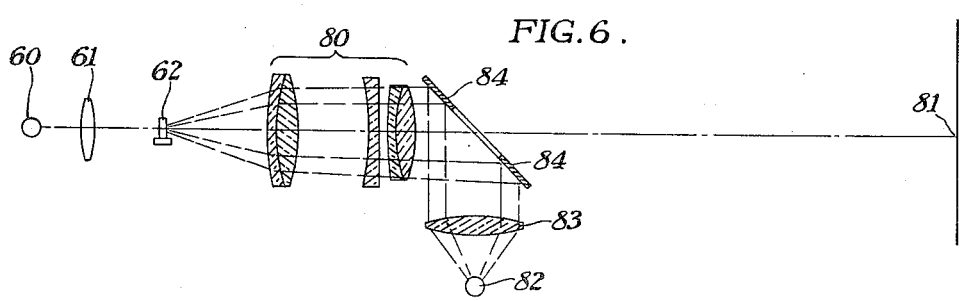

In Fig. 6 a telecentric projection lens 80 without any relay stage projects an image of the object 62 at the point 81. The telecentric stop of the lens 80 is obliquely arranged behind the lens and consists of an aperture in a reflector 84 which receives light from a lamp 82 through a condenser 83 and reflects this light through the objective 80 for episcopic illumination of the object 62.

Figure 7:
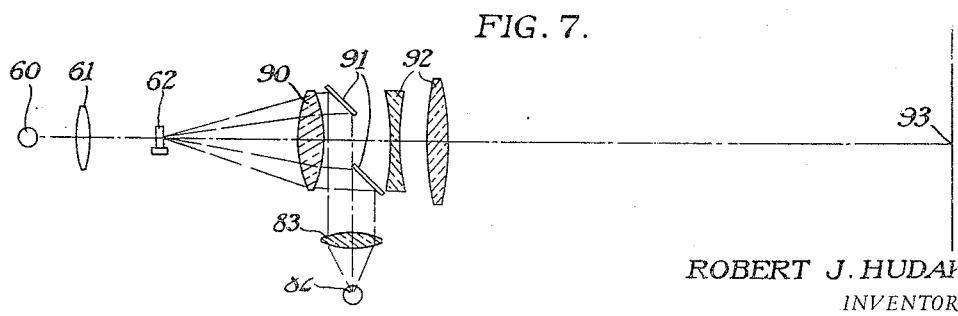

In Fig. 7 an ordinary objective consisting of a first lens 90 and two other lenses 92 with an internal stop, projects the image of the object 62 at the point 93. Again reflectors 91 adjacent to the internal stop receive light from the lamp 82 and condenser 83 and reflect it through a first lens 90 of the objective to illuminate the object 62 episcopically.

Figure 8:
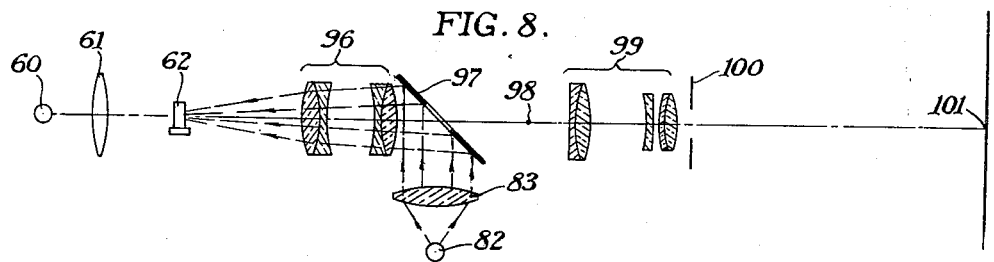

In Fig. 8 a first objective 96 forms a unit magnification image of the object 62 at the point 98 and this is relayed by telecentric lens 99 with its telecentric stop 100, to form an image at the point 101. As before, reflectors 97 receive light from the lamp 82 and condenser 83 and reflect it through the whole of the first objective system 96 to illuminate the object 62 episcopically.

Figure 9:
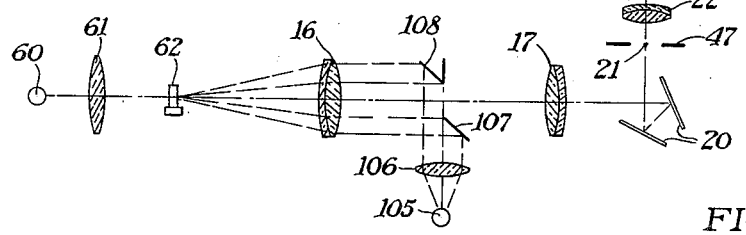

In the preferred form of the invention shown in Fig. 9, however, the first objective system is afocal consisting of lenses 16 and 17 and the episcopic illumination is provided by a lamp 105, a condenser 106, and two reflectors 107 and 108 adjacent to the telecentric stop of the afocal system. As shown in Fig. 10 these reflectors 107 and 108 are on the two sides of the telecentric stop which is in the form of an aperture in an opaque plate 109. Alternatively as shown in Fig. 11 the reflector may completely surround the telecentric stop by being in the form of a plate 111 having an elliptical aperture 112 therein which constitutes a telecentric stop. It is not essential that this aperture be elliptical and when the adjustable feature is desired, a simple adjustable diaphragm 113 is located behind the mirror 111. This shows particularly well in the rear view, Fig. 12 in which the diaphragm blades 114 have a circular opening through which the elliptical opening in the plate 111 may be seen from the rear.

In Fig. 13 the front surface of an object 121 which is episcopically illuminated according to the invention may be compared directly with the surface of a standard 122. Light from the standard is introduced into the optical system by a reflector 120 between the object 121 and the lens 16. Both the object 121 and the standard 122 are episcopically illuminated by light reflected by the mirrors 18 through the lens 16. The long working distance between the object 121 and the lens 16 permits the insertion of the mirror 120. It is usually more convenient to have the standard 122 at one side of the system and to use a reflector 120, tthan it would be to attempt to place the standard 122 immediately adjacent to the object 121.

What I claim and desire to secure by Letters Patent of the United States is:

1. An optical system for an optical comparator comprising a work holder, means for illuminating a work piece positioned on the work holder, a first objective system for forming an aerial image of the work piece when so positioned, a rear projection viewing screen, a second objective system optically aligned to receive light from the aerial image and to project a relayed image thereof onto the screen characterized by said screen being vertical and above said work holder, and by three plane reflecting surfaces being aligned in said optical system to receive light from the first objective system and, via the second objective system, reflect the light to the screen.

2. An optical system according to claim 1 in which the first objective system has its optical axis horizontal and consists of two lenses of equal focal length separated by the sum of their focal lengths with the effective stop located in their mutual focal plane, and the second objective system has its optical axis vertical and a focal length less than one-half that of either of said two lenses at least one of the three reflectors being positioned to reflect light from the first objective system to the second objective system, and at least one of the reflectors being positioned to reflect light from the second objective system to the screen.

3. An optical system according to claim 2 in which the second objective system consists of an objective with its stop internal and a field lens optically at its own focal length in front of the internal stop, between the aerial image and the objective, and in which a horizontal table is included in the plane of the aerial image for supporting indicia for comparison with the image, the table being apertured to transmit the image light.

4. An optical system according to claim 1 in which the means for illuminating the work piece gives episcopic illumination and consists of a light source and means for directing light from the source through at least the first lens of the first objective system toward the work piece.

5. An optical system for an optical comparator comprising a work holder, means for episcopically illuminating a work piece on the work holder, a first objective system for receiving light reflected from the work piece and for forming an aerial image thereof, said illuminating means consisting of a light source and means for directing light from the source through at least the first lens of the first objective system toward the work piece, a rear projection viewing screen and a second objective system optically aligned to receive light from the aerial image and to project a relayed image thereof onto the screen.

6. An optical system according to claim 5 in which the first objective system consists of two lenses optically separated by the sum of their focal lengths with the effective stop located at their mutual focal plane, said illuminating means consists of the light source positioned at one side of the optic axis of the afocal lens system and said directing means includes reflecting means adjacent to said stop for receiving light from the light source and directing it through the first lens of the afocal system to the work piece.

7. An optical system according to claim 5 in which the screen is vertical and above said work holder and which includes three plane-reflecting surfaces optically aligned in said optical system to receive light from the work piece horizontally through the first objective system, to reflect it vertically upward through the second objective system and to reflect it again horizontally to said screen.

ROBERT J. HUDAK.

REFERENCES CITED

The following references are of record in the file of this patent:

UNITED STATES PATENTS

| Number | Name | Date |
| --- | --- | --- |
| 2,103,230 | Benford et al. | Dec. 28, 1937 |
| 2,230,573 | Mestre | Feb. 4, 1941 |
| 2,373,928 | Turrettini | Apr. 17, 1945 |
| 2,373,930 | Turrettini | Apr. 17, 1945 |
| 2,409,328 | Wilder | Oct. 15, 1946 |
| 2,414,867 | Gradisar et al. | Jan. 28, 1947 |